United States Patent [19]

Morizumi

[11] Patent Number: 4,725,729
[45] Date of Patent: Feb. 16, 1988

[54] APPARATUS FOR CORRECTING UNEVENNESS OF LIGHT QUANTITY IN AN OPTICAL REPRODUCTION SYSTEM

[75] Inventor: Yoshiaki Morizumi, Shiga, Japan

[73] Assignee: Dainippon Screen Mfg. Co., Ltd., Kyoto, Japan

[21] Appl. No.: 823,937

[22] Filed: Jan. 29, 1986

[30] Foreign Application Priority Data

Apr. 9, 1985 [JP] Japan .................................. 60-73582

[51] Int. Cl.$^4$ ............................................. H01J 40/14
[52] U.S. Cl. .................................. 250/237 R; 250/578
[58] Field of Search ................... 250/578, 237 R, 204; 358/213, 294, 213.11, 213.13

[56] References Cited

U.S. PATENT DOCUMENTS

| | | | |
|---|---|---|---|
| 4,415,934 | 11/1983 | Konishi | 358/294 |
| 4,495,422 | 1/1985 | Wiggins | 250/237 R |
| 4,547,663 | 10/1985 | Kitagishi et al. | 250/204 |

*Primary Examiner*—Edward P. Westin
*Assistant Examiner*—Jessica L. Ruoff
*Attorney, Agent, or Firm*—Poms, Smith, Lande & Rose

[57] ABSTRACT

A picture reproduction apparatus for recording reproduced picture images of an original picture in which picture information on the original picture is projected onto a photoelectric converting element(s) such as a CCD line sensor(s) etc. through a focusing optical system, and according to an output signal therefrom unevenness of a light quantity of a light flux projected to the photoelectric converting element(s) is corrected to obtain a reproduction picture of uniform quality.

8 Claims, 5 Drawing Figures

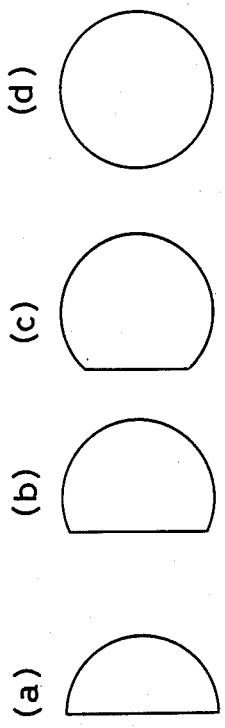
FIG. 2
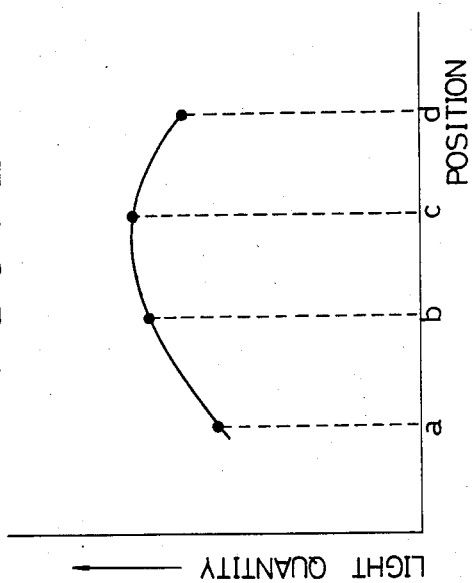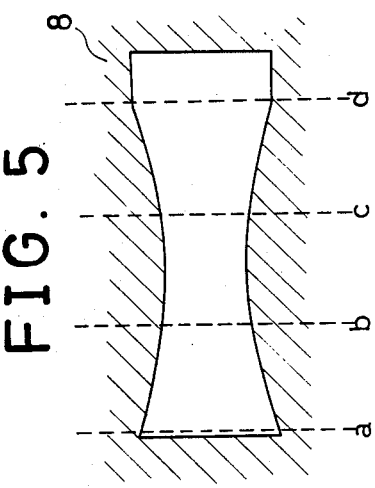
FIG. 3
FIG. 4
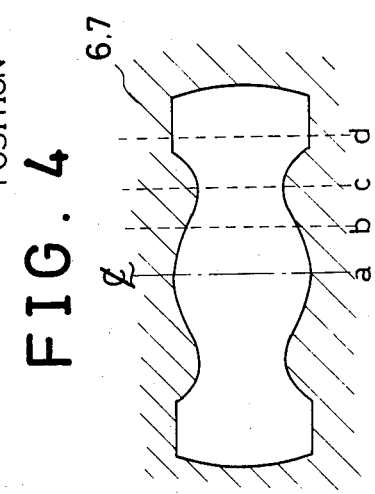
FIG. 5

APPARATUS FOR CORRECTING UNEVENNESS OF LIGHT QUANTITY IN AN OPTICAL REPRODUCTION SYSTEM

BACKGROUND OF THE INVENTION

The present invention relates to an optical system in a reproduction apparatus for recording a reproduced picture image of an original picture by projecting picture information on the original picture onto a photoelectrical converting elements(s) such as CCD line sensor etc. and basing on its (their) output signal(s) through a focusing optical system, and particularly relates to an apparatus for obtaining a reproduction picture image(s) of uniform picture quality by correcting unevenness in light quantity of a light quantity projected onto the photoelectrical converting element(s).

PRIOR ART

In Japanese Patent Laid-Open Publication No. 57-87277 there is disclosed an invention titled "A picture reading apparatus". Japanese patent laid-Open Publication No. 57-87277 corresponds to Japanese patent application No. 55-162980, which is one of three priority applications upon which U.S. Pat. No. 4,415,934 (entitled Image Reading Apparatus to M. Konishi issued Nov. 15, 1983) relies for its priority claim. The invention relates to a reproduction optical system for focusing each of light fluxes which pass through a lens and divided into two by a dome shaped reflection mirror disposed between the lens and its focusing plane by projecting each of the light fluxes onto individually independent line sensors in an apparatus for projecting and focusing picture information on an original picture onto the CCD line sensors disposed on the projecting plane through the lens.

The apparatus disclosed in the afore-mentioned publication is considered to be adapted that, when picture information on relatively small original pictures such as a micro film or the like is read out, size of each of line sensors is not required to be excessively large, and that adapted to obtain high resolving power.

The apparatus disclosed in the above described publication is itself considerably useful, however, when the apparatus is actually applied to a picture scanning reproduction apparatus, for example, such as a facsimile or the like, there is found a problem. The problem is as follows, that is, in the apparatus between a lens and its projecting image focusing plane a dome shaped mirror is disposed, so that according to a portion of the focusing plane, certain parts of a light flux which transmitted effective diameter (effective part) of the focusing lens are not reflected, that is, only some parts of the light flux can be utilized, which results in generating partial unevenness in light quantity. In consequence there occurs a problem that even in a recorded reproduction picture(s) unevenness in density is also reproduced. Such unevenness in density is an essential fault in reproduction of the photographic original picture of proper gradation required for faithfully reproducing gradation of the original picture. Solution of the afore-mentioned problem is highly desired.

SUMMARY OF THE INVENTION

It is an object of the present invention to obtain approximately uniform light quantity distribution over the whole projected light focusing plane in the afore-mentioned picture scanning reproduction apparatus by providing an iris plate having an opening of a size corresponding to the light quantity distribution on the focusing plane or an optical filter having density distribution corresponding to the above described light quantity distribution with which cross section of a light passage in which the light quantity of the light flux passes through is lowered.

According to the present invention, by limiting appropriately unevenness of projecting light flux which causes unevenness of light quantity in the focusing plane with an iris or an optical filter, almost uniform light quantity distribution can be obtained in the projecting light focusing plane, and a reproduction picture of high quality having no unevenness can be recorded.

BRIEF DESCRIPTION OF THE DRAWINGS

FIG. 2 is a graph representing distribution of light quantity in the focusing plane of the means shown in FIG. 1;

FIG. 3 is a view diagrammatically showing shape of section of each of light fluxes on the mirror surface;

FIG. 4 is a view showing shape of an iris plate disposed at a position 6 or 7 shown in FIG. 1; and FIG. 5 is a view showing shape of an opening of an iris plate disposed at a position 8.

DETAILED DESCRIPTION OF PREFERRED EMBODIMENT

Figure 1:
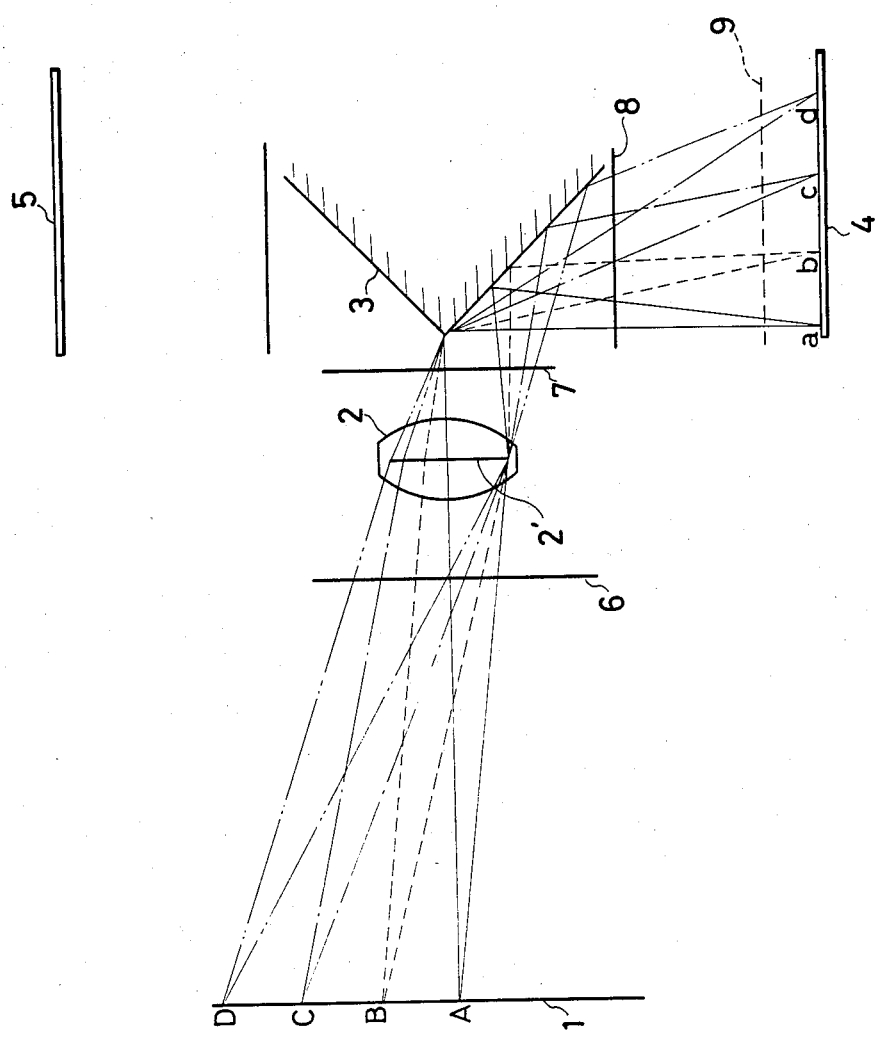
FIG. 1 is a schematic view showing a reproducing optical system applied to the present invention.

FIG. 1 is a schematic view showing a composition of an embodiment of the present invention.

An original picture 1 to be reproduced is emitted linearly by an emitting means (not shown), and is fed in the direction vertical to the surface of this sheet. A focused image of the emitted portion is projected by a lens 2 to a pair of CCD (charge coupled device) line sensors 4 and 5 disposed at a focusing plane through a dome shaped or triangular roof-shaped mirror 3.

In this case areas of the original picture upper than a boarder line basing on an (A) point positioned on an optical axis of the lens 2 are projected onto the lower sensor 4, and areas of the original picture lower than the point (A) are projected onto the upper line sensor 5. The apparatus of the afore-mentioned construction has been already disclosed in the prior application, Japanese Patent Laid-Open Publication No. 57-87277.

However, merely basing on the above described apparatus, if a picture signal is output from the two sensors 4 and 5, since there exists partial unevenness in light quantity in a light flux projected to the line sensor, consequently unevenness in density is generated in a reprojection picture. The reason of the afore-mentioned will be able to understand by studying geometrically optical passages in the optical system of the apparatus shown in FIG. 1. That is, in FIG. 1, considering each of light passages passing through which respective images is focused on respective points (A), (B), (C) and (D) (the point (A) is positioned on the optical axis) on the area of the original picture which is projected and focused on the sensor 4 at the lower part, at first, in the image of the point (A) on the optical axis only a light flux passing through the lower half part of an effective diameter 2′ of the lens 2 as shown by solid lines are reflected at the lower half part of the dome shaped mirror 3, and converge on a point (a) on the line sensor 4. Accordingly, light quantity having passed through the effective diameter 2' of the lens 2, a half of the whole light quantity, is projected on the point (a).

Next, in the image of the point (B) somewhat remote from the optical axis light axis, fluxes which comprises the flux having passed through the lower half part of the effective diameter 2' of the lens 2 and a part of a flux having passed through the upper half part of the lens are reflected, as shown in dotted lines in FIG. 1, at the lower part of the dome shaped mirror 3, and converged to the point (b) on the line sensor 4. Accordingly, on the point (b), light quantity smaller than that of having passed through the whole effective diameter 2' of the lens 2 but larger than that of projected on the point (a) is projected. In addition, in an image of the point (c) on the original picture 1 remote from the optical axis, as shown by dot and chain lines in FIG. 1, fluxes comprising the flux passing through the lower half part of the effective diameter 2' of the lens 2 and a flux passing through an area of the upper half which is a little larger than that of the case of the point (B) are reflected on the lower half part of the dome shaped mirror 3, and converged to a (c) point. Accordingly, to the point (c), light quantity smaller than the whole light quantity which passes through the effective diameter 2', but larger than that of projected onto the point (b) is projected. In an image of the point (D) on the original picture 1 which is farther from the optical axis, as shown by two dots and chain lines in FIG. 1, a light flux having passed through the whole effective diameter 2' of the lens is reflected at the lower half part of the dome shaped mirror 3, and converged to a point (d) on the line 4. As can be well understood, onto the point (d) the largest light quantity is projected, however, at the peripheral portion of the picture since there exists falling phenomenon is absolute light quantity, practically somewhat smaller light quantity than that of at the point (c) is projected.

The above descriptions have been developed regarding fluxes which are reflected on the lower half part of the dome shaped mirror 3 and projected on the lower line sensor 4 to be focused. However, quite the same descriptions can be applied to the case regarding the upper half part. It is needless to say that they are shown as a view which is symmetrical in the upper half and the lower half with respect to the optical axis.

In FIG. 2 there is shown a graph representing distribution of light quantity projected on each of positions of the sensor 4. From the graph it can be seen that at the point (a) light quantity is small, but it increases as position separates from the optical axis, and at the vicinity of point (c) it attains the maximum value, then it gradually decreases towards the point (d).

In FIG. 3, each of shapes of sections of the respective fluxes at the surface of the dome shaped mirror 3 projected to each of the points (a), (b), (c) and (d) is diagrammatically shown. Shapes of these sections indicate that because of some parts of them being projected on the other reflection surface side of the dome shaped mirror 3, partially broken circular shaped light fluxes which should have been essentially complete circular shaped sections are generated.

From afore-mentioned geometrical are view it will be well understood that in the optical system shown in FIG. 1, in the images of the original picture projected on the line sensors 4 and 5, it is consequently impossible to avoid occurrence of unevenness in light quantity. As in the present invention it is aimed to correct the afore-mentioned unevenness in light quantity and record a reproduction picture(s) of good quality which is free from unevenness in density, there is disposed an iris plate of desired shape or an optical filter having desired density distribution at an appropriate position in the course of a light passage from the surface of the original picture to the focusing plane, and light quantity of the light flux projected at the vicinity of the above mentioned point (c) or (b) is limited so that approximately uniform distribution of light quantity may be obtained.

The iris plate for correcting unevenness of light quantity in the apparatus of the present invention can be disposed, if roughly classified, at three positions. That is, those three positions are, as shown in FIG. 1, a position between the original picture 1 and the lens 2 at which an iris plate 6 is provided, a position between the lens 2 and the dome shaped mirror 3 at which an iris plate 7 is disposed, or a position between the dome shaped mirror 3 and the line sensor 4 at which an iris plate 8 is disposed. Each of shapes of the respective sections or sectional areas of the fluxes passing through each of those positions is different with one another, so that shapes of those iris plates to be used should be selected basing on the positions at which they are disposed.

FIG. 4 shows a shape of an opening of the iris plate 6 or 7. In the both iris plates 6 and 7, shapes of sections of the fluxes are symmetrical with respect to the optical axis, so that the shapes of openings of the iris plates 6 and 7 are, of course, symmetrical. Accordingly, at the part of the point (a) or (d) through which a light flux of small light quantity projected thereto, distance between opposite sides of the opening is made larger, and while at the part of the point (b) or (c) through which a light flux of large light quantity projected onto the point, distance between the opposite sides of the opening is made smaller.

In addition, as can be clearly understood from FIG. 1, width of the whole light flux (in the upper and down direction in FIG. 1) which passes through the position at which the iris plate 6 is disposed and that of the whole light flux which passes through another position at which the iris plate 7 is disposed are different from each other, accordingly, it is needless to say that the iris plate 7 is made smaller than the iris plate 6 so that the whole size of the opening may be coincided with the width of the light flux. Therefore, these openings become similar figures of different sizes.

Further, the iris plate 8 disposed between the dome shaped mirror 3 and the line sensor 4 or 5 has an asymmetrical sectional shape resulted from the light flux passing through this part having been already divided into several light fluxes by the dome shaped mirror 3. It is desirable to have a sectional shape as shown in FIG. 5, so that the sectional shape may have an opening size which is inversely proportion to light quantity by corresponding to the graph shown in FIG. 2 which represents distribution of light quantity.

As described the above, though the iris plate may be disposed at any of the three positions, theoretically it is possible to achieve the object of the present invention, that is, it is possible to obtain evenness in distribution of light quantity projected to the line sensor 4 or 5. However, in the case of applying the present invention to a practical picture scanning recording apparatus, it is advantageous to dispose the iris plate between the dome shaped mirror 3 and the line sensor 4 or 5. The reason consists in that, in order to form an opening shape corresponding to the distribution of the light quantity on the line sensor finally, the iris plate 8 which is disposed at the nearest position of the line sensor is advisable.

Heretofore, detailed descriptions have been developed with respect to the embodiment providing the iris plate 6, 7 or 8 having an opening of desired shape. However, as afore-mentioned, an optical filter having desired density distribution can be applied instead of the iris plate.

Such optical filter as mentioned the above is formed as follows, that is, a light shielding pattern having density distribution corresponding to the shape of the opening of the iris plate shown in FIGS. 4 or 5 is formed on a transparent base. The light shielding pattern is composed of a pattern which represents high density at positions where distance between each of their opposite sides is smaller, but represents low density at positions where distance between each of their opposite sides is large. By disposing this optical filter in the light passage instead of the iris plate 6, 7 or 8, the same light flux limiting effect as each of those cases in which the iris plate 6, 7 or 8 can be generated.

The most practical means for manufacturing the above described optical filter is to apply a photographical means which utilizes a photographical film(s). To realize the above practical means, it is advantageous to dispose the optical filter at the front surface shown by a dotted line 9 in FIG. 1 of the sensor 4 or the 5 (however, the case of the 5 is not shown), and hereinafter the means will be described.

In FIG. 1, instead of the original picture 1 an object of uniform density distribution, for example, a sheet of white paper, is set on, an unexposed photographic film is disposed at the position 9 opposite to the dome shaped mirror 3 at the front plane of the line sensors 4 and 5, and on the film an image of the object is exposed through the lens 2 and the dome shaped mirror 3. When the exposed film is developed, areas at which received light quantity was large turn out to be high density areas, and areas at which received light quantity was small are found to be low density areas. That is, density distribution thereof is just proportional to the distribution condition of the projected light quantity.

By setting on an exposed and developed film as an optical filter on the position 9 which is same position that it was exposed, the original picture 1 is projected onto the line sensor 4 or 5 to focus an image of the original 1 thereon through the lens 2 and the dome shaped mirror 3. Since distribution of the light quantity corresponds to the density distribution of the optical filter, unevenness in both of them is offset, and light fluxes passing through the optical filter incident upon the line sensor with approximately uniform distribution in light quantity. Thus, as same as the case of the iris plate being applied, a picture signal(s) of excellent quality can be output. However, the above mentioned means for manufacturing the optical filter is limited to the only case in which the optical filter made of developed photographic film is disposed at the position 9, i.e., the position between the dome shaped mirror 3 and the line sensor 4 or 5, and an optical filter disposed at the pre-stage of the dome shaped mirror 3 can not be manufactured by the afore-mentioned means. But by disposing the optical filter at any one of the afore-mentioned three positions, the object of the present invention can be achieved, and that even the optical filter can be efficiently applied in practical use as well as the iris plate, if it is disposed between the dome shaped mirror and the line sensor, since it exhibits the most effective function when it is disposed at the position.

The effect and function are as follows:

(1) in a reproduction optical system adapted to obtain a high resolving power with a relatively small line sensor by using the dome shaped mirror, unevenness in light quantity which consequently generates in using the dome shaped mirror can be surely corrected;

(2) the present invention can be easily practiced merely by disposing the iris plate or the optical filter at an appropriate position in the optical passage; and (3) the present invention can be easily practiced by the already completed reproduction optical system without adding any large scale of modification thereto.

What is claimed is:

1. An apparatus for correcting unevenness of light quantity in an optical reproduction system, when an original picture is projected onto a plurality of photoelectric converting elements and focused thereon, to output the focused original images as picture signals in an optical reproduction system, in which a light flux is divided into two light fluxes by a triangular roof-shaped mirror disposed at the rear of the lens, to project said two light fluxes onto respectively independent photoelectric converting elements and focus each of their images thereon, wherein the improvement comprises:

a light quantity adjusting means, being an iris plate having a shape which varies the projected light quantity, said projected light quantity passing through said plate corresponding to a light quantity of each of said light fluxes projected onto each of said photoelectric converting elements at predetermined areas;

said iris plate disposed in said light passages, said plate having an opening of a shape having a border which defines opposite sides of the opening to be partially of differing widths such that said opening of said iris plate is inversely proportional to said light quantity in a focusing plane of said lens through which said light flux passes.

2. An apparatus for correcting unevenness of a light quantity in an optical reproduction system when an original picture is projected onto a plurality of photo electric converting elements in focus thereon to output the focused original picture images as picture signals in an optical reproduction system in which a light flux is divided into two light fluxes by a triangular roof-shaped mirror disposed at the rear of a lens to project said two fluxes onto respectively independent photo electric converting elements and focus each of their images thereon, wherein the improvement comprises:

a light quantity adjusting means being an optical filter having a density distribution which varies in proportion to the light quantity in a focusing plane through which the light flux passes.

3. The apparatus for correcting unevenness of light quantity in an optical reproduction system as defined in claims 1 or 2, wherein said light quantity adjusting means is disposed between the original picture and the lens.

4. The apparatus for correcting unevenness of light quantity in an optical system as defined in any of claims 1 or 2, wherein said light quantity adjusting means is disposed between said lens and said triangular roof-shaped mirror.

5. The apparatus for correcting unevenness of light quantity in an optical reproduction system as defined in claims 1 or 2, wherein said light quantity adjusting means is disposed between said triangular roof-shaped mirror and said photo electric converting elements.

6. A system for evening out the light flux projected in an optical reproduction system, said light flux derived from an original picture, comprising:
   means for directing said light flux onto two sides of a triangular roof-shaped mirror;
   said triangular roof-shaped mirror having at least two sides meeting at a raised apex projecting said light flux onto a plurality of light sensors;
   said mirror dividing said flux into two portions, one of said portions projected onto a first of said sensors and the other of said portions projected onto a second of said sensors;
   means for adjusting a light quantity from said divided flux positioned between said light flux directing means and said triangular roof-shaped mirror;
   said light quantity adjusting means defining a flux control opening having an area inversely proportional to the light quantity in a focusing plane of said light flux directing means.

7. The system for evening out the light flux projected in an optical reproduction system as in claim 6, wherein:
   said light flux directing means is a lens; and,
   said light quantity adjusting means is an iris plate.

8. The system for evening out the light flux projected in an optical reproduction system as in claim 6 wherein, said light quantity adjusting means is an optical filter;
   said optical filter has a density distribution which is proportional to said light quantity in said focusing plane of the light flux directing means, as said light flux passes through said optical filter.

* * * * *